(12) United States Patent
Gutknecht et al.

(10) Patent No.: US 9,635,870 B2
(45) Date of Patent: May 2, 2017

(54) DIRECT-SET CHEESE

(75) Inventors: Jon R. Gutknecht, Delray Beach, FL (US); John B. Ovitt, Franklin, VT (US)

(73) Assignee: FRANKLIN FOODS HOLDINGS INC., Delray Beach, FL (US)

( * ) Notice: Subject to any disclaimer, the term of this patent is extended or adjusted under 35 U.S.C. 154(b) by 805 days.

(21) Appl. No.: 13/341,497

(22) Filed: Dec. 30, 2011

(65) Prior Publication Data

US 2012/0219690 A1 Aug. 30, 2012

Related U.S. Application Data (63) Continuation-in-part of application No. 13/037,292, filed on Feb. 28, 2011.

(51) Int. Cl.
*A23C 19/055* (2006.01)
*A23C 19/045* (2006.01)

(52) U.S. Cl.
CPC ........ *A23C 19/055* (2013.01); *A23C 19/0455* (2013.01)

(58) Field of Classification Search
CPC ............................. A23C 19/055; A23C 19/08
USPC ........................................ 426/582, 585, 541
See application file for complete search history.

(56) References Cited

U.S. PATENT DOCUMENTS

| | | | |
|---|---|---|---|
| 2,387,276 A | 10/1945 | Link |
| 2,436,498 A | 2/1948 | Strezynski |
| 3,431,115 A | 3/1969 | Biasi |
| 3,749,583 A | 7/1973 | Cox |

(Continued)

FOREIGN PATENT DOCUMENTS

| | | |
|---|---|---|
| DE | 3314551 C1 | 11/1984 |
| EP | 0368492 A1 | 5/1990 |

(Continued)

OTHER PUBLICATIONS

"Nutrient data for 01079, Milk, reduced fat, fluid, 2% milkfat, with added vitamin A and vitamin D," USDA National Nutrient Database for Standard Reference, downloaded on Aug. 20, 2013 from http://ndb.nal.usda.gov/ndb/foods, 2 pp.

(Continued)

*Primary Examiner* — Elizabeth Gwartney
(74) *Attorney, Agent, or Firm* — Jay M. Brown (57) ABSTRACT

Process: providing concentrated milk composition including milk protein; providing plant fat composition including plant fat; combining first amount of concentrated milk composition together with second amount of plant fat composition, forming concentrated milk-plant fat composition having initial pH and having concentration by weight of water being within range of between about 49% and about 57%; combining concentrated milk-plant fat composition together with amount of edible acid, and directly setting concentrated milk-plant fat composition by adjusting initial pH to reduced pH being within range of between about 4.9 and about 4.5; thereby forming uniform non-separating direct-set milk-plant fat product substantially retaining the milk protein. Process also includes providing concentrated milk composition and plant fat composition respectively at first and second temperatures being at least about 20° F. above melting points of respective compositions. Composition: uniform non-separating direct-set milk-plant fat product.

25 Claims, 1 Drawing Sheet

(56) References Cited

U.S. PATENT DOCUMENTS

| | | | |
|---|---|---|---|
| 3,852,158 A | 12/1974 | Anderson | |
| 3,929,892 A | 12/1975 | Hynes | |
| 3,998,700 A | 12/1976 | Reinbold | |
| 4,020,186 A | 4/1977 | Edwards | |
| 4,110,476 A | 8/1978 | Rhodes | |
| 4,194,011 A | 3/1980 | Invernizzi | |
| 4,232,050 A * | 11/1980 | Rule et al. | 426/582 |
| 4,293,573 A | 10/1981 | Bradley | |
| 4,341,801 A | 7/1982 | Weissman | |
| 4,397,878 A | 8/1983 | Koide | |
| 4,402,986 A | 9/1983 | Sinkoff | |
| 4,410,549 A | 10/1983 | Baker | |
| 4,434,184 A | 2/1984 | Kharrazi | |
| 4,518,616 A | 5/1985 | Czulak | |
| 4,534,982 A | 8/1985 | Yoshida | |
| 4,560,560 A | 12/1985 | Narimatsu | |
| 4,569,846 A | 2/1986 | Ohzeki | |
| 4,678,673 A | 7/1987 | Marshall | |
| 4,724,152 A | 2/1988 | Baker | |
| 4,732,769 A | 3/1988 | Sozzi | |
| 4,749,584 A | 6/1988 | Wirchanshy | |
| 4,837,035 A | 6/1989 | Baker | |
| 4,837,036 A | 6/1989 | Baker | |
| 4,952,414 A | 8/1990 | Kaufman | |
| 4,956,186 A | 9/1990 | Streiff | |
| 4,968,512 A | 11/1990 | Kharrazi | |
| 4,980,179 A | 12/1990 | Koenraads | |
| 5,009,867 A | 4/1991 | Kratochvil | |
| 5,079,024 A | 1/1992 | Crane | |
| 5,098,729 A * | 3/1992 | Engel | 426/582 |
| 5,143,742 A | 9/1992 | Maroudas | |
| 5,165,945 A | 11/1992 | Yee | |
| 5,180,604 A | 1/1993 | Crane | |
| 5,252,352 A | 10/1993 | Banach | |
| 5,356,639 A | 10/1994 | Jameson | |
| 5,378,478 A | 1/1995 | Miller | |
| 5,395,631 A | 3/1995 | Sweeney | |
| 5,449,523 A | 9/1995 | Hansen | |
| 5,470,593 A | 11/1995 | Meilinger | |
| 5,520,948 A | 5/1996 | Kvamme | |
| 5,580,592 A | 12/1996 | Nassauer | |
| 5,656,320 A | 8/1997 | Cheng | |
| 5,676,984 A | 10/1997 | Bohanan | |
| 5,679,396 A | 10/1997 | Finnocchiaro | |
| 5,807,601 A | 9/1998 | Carpenter | |
| 5,820,903 A | 10/1998 | Fleury | |
| 5,846,592 A | 12/1998 | Alderliesten | |
| 5,851,577 A | 12/1998 | Brenton | |
| 5,882,704 A | 3/1999 | Yamaguchi | |
| 5,916,608 A | 6/1999 | Lanting | |
| 6,025,008 A | 2/2000 | Akahoshi | |
| 6,036,979 A | 3/2000 | Hormann | |
| 6,096,352 A | 8/2000 | Kijowski | |
| 6,096,870 A | 8/2000 | Mozaffar | |
| 6,136,351 A | 10/2000 | Nauth | |
| 6,183,802 B1 | 2/2001 | Silva | |
| 6,183,805 B1 | 2/2001 | Moran | |
| 6,303,160 B1 | 10/2001 | Laye | |
| 6,365,205 B1 | 4/2002 | Wahlgren | |
| 6,406,736 B1 | 6/2002 | Han | |
| 6,416,797 B1 | 7/2002 | Han | |
| 6,419,974 B1 | 7/2002 | Silva | |
| 6,419,975 B1 | 7/2002 | Han | |
| 6,485,762 B1 | 11/2002 | Rivzi | |
| 6,544,567 B1 | 4/2003 | Davis | |
| 6,558,716 B1 | 5/2003 | Kent | |
| 6,572,901 B2 | 6/2003 | Han | |
| 6,689,402 B1 | 2/2004 | Nauth | |
| 6,740,344 B2 | 5/2004 | Murphy | |
| 6,787,348 B1 | 9/2004 | Kringelum | |
| 6,835,404 B2 | 12/2004 | Trecker | |
| 6,861,080 B2 | 3/2005 | Kent | |
| 6,893,670 B2 | 5/2005 | Smith | |
| 6,982,100 B2 | 1/2006 | Swearingen | |
| 7,018,664 B2 | 3/2006 | Hoier | |
| 7,083,815 B2 | 8/2006 | Gutknecht | |
| 7,150,894 B2 | 12/2006 | Cha | |
| 7,250,183 B2 | 7/2007 | Lindstrom | |
| 7,258,886 B2 | 8/2007 | Brue | |
| 7,329,424 B2 | 2/2008 | Koka | |
| 7,572,473 B2 | 8/2009 | Gutknecht | |
| 7,579,029 B2 | 8/2009 | Wolf-schoon | |
| 7,582,326 B2 | 9/2009 | Brown | |
| 7,585,537 B2 | 9/2009 | Merrill | |
| 7,687,095 B2 | 3/2010 | Ma | |
| 7,713,564 B2 | 5/2010 | Merrill | |
| 7,732,184 B2 | 6/2010 | Kringelum | |
| 7,763,294 B2 | 7/2010 | Gutknecht | |
| 7,897,185 B1 | 3/2011 | Gutknecht | |
| 7,932,078 B2 | 4/2011 | Posseme | |
| 7,998,519 B2 | 8/2011 | Gutknecht | |
| 8,021,883 B2 | 9/2011 | Stroman | |
| 8,137,950 B2 | 3/2012 | Stuer-Lauridsen | |
| 8,226,936 B2 | 7/2012 | Stroeman | |
| 8,236,550 B2 | 8/2012 | Fremaux | |
| 8,440,450 B2 | 5/2013 | Stroman | |
| 8,449,932 B2 | 5/2013 | Bezenger | |
| 8,481,027 B2 | 7/2013 | Stavnsbjerg | |
| 8,501,456 B2 | 8/2013 | Yde | |
| 8,597,929 B2 | 12/2013 | Kringelum | |
| 8,628,763 B2 | 1/2014 | Folkenberg | |
| 8,673,616 B2 | 3/2014 | Garrigues | |
| 8,697,422 B2 | 4/2014 | Stahnke | |
| 8,765,118 B2 | 7/2014 | Garrigues | |
| 2003/0031758 A1 | 2/2003 | Koss | |
| 2003/0219510 A1 | 11/2003 | Kent | |
| 2004/0028801 A1 * | 2/2004 | Gao et al. | 426/656 |
| 2004/0146605 A1 | 7/2004 | Weibel | |
| 2005/0064067 A1 | 3/2005 | Schmitt | |
| 2005/0180962 A1 | 8/2005 | Raz | |
| 2006/0024412 A1 | 2/2006 | Cha | |
| 2006/0068075 A1 | 3/2006 | Fultz | |
| 2006/0141096 A1 | 6/2006 | Gutknecht | |
| 2006/0246180 A1 | 11/2006 | Galal | |
| 2007/0077332 A1 | 4/2007 | Moran | |
| 2008/0050467 A1 | 2/2008 | Schlothauer | |
| 2008/0160133 A1 | 7/2008 | Brooks | |
| 2009/0041920 A1 | 2/2009 | Eibel | |
| 2009/0123601 A1 | 5/2009 | Wolf-schoon | |
| 2009/0232937 A1 | 9/2009 | Burningham | |
| 2010/0092608 A1 | 4/2010 | Gutknecht | |
| 2010/0098820 A1 | 4/2010 | Imai | |
| 2010/0143537 A1 | 6/2010 | Solanes | |
| 2011/0117242 A1 | 5/2011 | Gutknecht | |
| 2011/0268841 A1 | 11/2011 | Gutknecht | |
| 2013/0344199 A1 | 12/2013 | Kibenich | |
| 2015/0064152 A1 | 3/2015 | Hornbaek | |
| 2015/0079057 A1 | 3/2015 | Hornbaek | |
| 2015/0223480 A1 | 8/2015 | Bisgaard-Frantzen | |
| 2016/0068800 A9 | 3/2016 | Hornbaek | |

FOREIGN PATENT DOCUMENTS

| | | |
|---|---|---|
| EP | 2258832 A2 | 12/2010 |
| GB | 2290937 A | 1/1996 |
| IT | 1178926 B2 | 9/1987 |
| WO | 9637114 A1 | 11/1996 |
| WO | 9962348 A1 | 12/1999 |

OTHER PUBLICATIONS

Commonly-owned U.S. Appl. No. 13/803,220, filed Mar. 14, 2013, (55 pages).

Kurtzweil, Paula, "Skimming the Milk Label: Fat-Reduced Milk Products Join the Food Labeling Fold," FDA Consumer, Jan.-Feb. 1998, vol. 32 Issue 1, p. 22; full text downloaded as 6 pages on Jul. 31, 2013 from: http://www.nclive.org.ezproxy.co.wake.nc.us/cgi-bin/nclsm?url=%22http://search.ebscohost.com.ezproxy.co.wake.nc.us/login.aspx?direct=true&db=a9h&AN=186486&site=ehost-live%22.

Almecija et al., "A flux enhancing pretreatment for the ultrafiltration of acid whey," Desalination, vol. 246 (2009) pp. 364-369.

(56) References Cited

OTHER PUBLICATIONS

Westergaard, Vagn, "Milk Powder Technology—Evaporation and Spray Drying," Niro A/S, (2004), 337 pp.; published online at www.niro.com.
"Nutrients in Milk," downloaded on Jan. 11, 2011 from www.dairyforall.com; 2 pp.
"U.S. Whey Exports," downloaded on Feb. 22, 2011 from www.fas.usda.gov; (updated May 2, 2003); 4 pp.
"Utilization of Whey," downloaded on Jan. 11, 2011 from www.dairyforall.com; 1 p.
"Whey," downloaded on Jan. 11, 2011 from www.dairyforall.com; 2 pp.
"Whey Protein Concentrates," downloaded on Jan. 11, 2011 from www.dairyforall.com; 2 pp.
"Reference Manual for U.S. Whey and Lactose Products," U.S. Dairy Export Council; downloaded on Feb. 23, 2011 from www.usdec.org (publication date unknown); 226 pp.
Daschner, F. et al., "Optimization of the microwave determination of water in foods using principal component analysis," Instrumentation and Measurement Technology Conference 2000 (IMTC 2000; Proceedings of the 17th IEEE), May 1-4, 2000, vol. 1 pp. 12-16; [Abstract Only, 1 p.].
GEA Niro Method No. A 9 b, "Total Fat by Gerber/Teichert", revised Sep. 2005, published on-line at www.niro.com; 2 pp.
"Protein Determination: Protein Nitrogen Content of Milk—Kjeldahl Method (Direct Method)", Jun. 1991, published on-line by the United States Department of Agriculture at www.fmmaseattle.com; 11 pp.
Davis, J.G., "Yogurt Cheese," The Milk Industry, Apr. 1971, pp. 8-11.
"Composition of Different Species of Milk," downloaded on Dec. 20, 2011 from www.dairyforall.com; 1 p.
Supplementary European Search Report: cover sheet; "Documents considered to be relevant"; and "Annex." Published on Dec. 21, 2011 in counterpart European patent application No. 06772970.7 (3 pages).
Supplementary European Search Report: cover sheet; "Documents considered to be relevant"; and "Annex." Published on May 19, 2011 in European patent application No. 05853377.9 (3 pages).
International Search Report published on Aug. 21, 2006 in PCT/US05/44435 (8 pages).
Commonly-owned U.S. Appl. No. 11/453,941, filed Jun. 15, 2006, (32 pages).
Commonly-owned U.S. Appl. No. 13/037,292, filed Feb. 28, 2011, (41 pages).
Commonly-owned U.S. Appl. No. 13/341,434, filed Dec. 30, 2011, (35 pages).
Commonly-owned U.S. Appl. No. 13/341,563, filed Dec. 30, 2011, (34 pages).
Newlander, C.E., "The Babcock Test: Notes on its Use in Determining TM Percentage of Fat in Whole Milk, Skim-Milk, Buttermilk, Cream and Whey," Bulletin No. 2, Extension Series, Mar. 1916, pp. 1-11, Publisher: Michigan Agricultural College, Extension Division.
Tamime et al., "Yoghurt Science and Technology", Pergamon Press, Oxford, p. 250, Fig. 5.12 (1985).
Roberfroid, Marcel B., et al., "The Bifidogenic Nature of Chicory Insulin and its Hydrolysis Products", Journal of Nutrition, vol. 128, No. 1, pp. 11-19 (American Society for Nutritional Sciences, Jan. 1998.
Zubillaga, M., et al., "Effect of probiotics and functional foods and their use in different diseases", Nutrition Research, vol. 21, pp. 569-579 (Elsevier Science Inc. 2001).
U.S. Food & Drug Administration, Grade "A" Pasteurized Milk Ordinance, 2001 Revision, 152pp.
Waukesha Cherry-Burrell, Votator Scraped Surface Heat Exchangers, 2001, 12pp.
Danisco, "Distilled monogycerides" (2005), 2pp.
BASF Technical Bulletin, "Beta-carotene 15M Dispersion in Corn Oil" (2004), 1p.
Cerning et al., "Isolation and Characterization of Exopolysaccharides from Slime-Forming Mesophilic Lactic Acid Bacteria,"J. Dairy Sci., vol. 75 (1992), pp. 692-699.
Kosin et al., "Microbial and Processing Criteria for Production of Probiotics: A Review," Mar. 2006, Food Technol. Biotechnol. vol. 44 No. 3, pp. 371-379.
Charteris et al., "Edible table (bio)spread containing potentially probiotic *Lactobacillus* and *Bifidobacterium* species," Int. J. Dairy Tech., Feb. 2002, vol. 55, No. 1, pp. 44-56.
Supplementary European Search Report: cover sheet; "Documents considered to be relevant"; and "Annex." Published on Aug. 7, 2009 in European patent application No. 07796426.0 (3 pages).
International Search Report published on Jun. 12, 2006 in PCT/US06/22888 (8 pages).
International Search Report published on Oct. 14, 2005 in PCT/US04/02538 (8 pages).
International Search Report published on Nov. 13, 2007 in PCT/US07/14749 (8 pages).

\* cited by examiner

DIRECT-SET CHEESE

PRIORITY CLAIM

This application is a continuation-in-part of commonly-owned U.S. patent application Ser. No. 13/037,292, filed on Feb. 28, 2011, entitled "Processes for Making Cheese Products Utilizing Denatured Acid Whey Proteins," the entirety of which hereby is incorporated herein by reference.

BACKGROUND OF THE INVENTION

1. Field of the Invention

The present invention relates to the field of direct-set milk products, and processes for making direct-set milk products.

2. Background of the Invention

Milk products are ubiquitous in modern diets. Direct-set milk products may be made by processes that include combining a milk composition together with an edible acid. Despite the existence of direct-set milk products and of such processes, further improvements in direct-set milk products and in processes for making such products are still needed.

SUMMARY

In an example of an implementation, a process is provided that includes: providing a concentrated milk composition including milk protein; providing a plant fat composition including plant fat; combining a first amount of the concentrated milk composition together with a second amount of the plant fat composition, forming a concentrated milk-plant fat composition having an initial pH and having a concentration by weight of water being within a range of between about 49% and about 57%; combining the concentrated milk-plant fat composition together with an amount of an edible acid, and directly setting the concentrated milk-plant fat composition; thereby forming a uniform non-separating direct-set milk-plant fat product substantially retaining the milk protein. The process also includes providing the concentrated milk composition at a first temperature being at least about 20 degrees Fahrenheit (° F.) above a melting point of the concentrated milk composition. The process further includes providing the plant fat composition at a second temperature being at least about 20° F. above a melting point of the plant fat composition. In addition, the process includes directly setting the concentrated milk-plant fat composition by adjusting the initial pH to a reduced pH being within a range of between about 4.9 and about 4.5.

In some examples of implementations of the process, the providing the concentrated milk composition includes providing the concentrated milk composition as including a concentrated milk protein source, wherein the concentrated milk protein source includes: aqueous nonfat milk; condensed nonfat milk; dry nonfat milk ("NFDM"); or reconstituted nonfat milk.

In further examples of implementations of the process, the providing the concentrated milk composition includes providing the concentrated milk composition as having a concentration by weight of milk fat being less than about 1%.

In additional examples of implementations of the process, the providing the concentrated milk composition includes providing the concentrated milk composition as having a concentration by weight of milk fat being within a range of between about 0.99% and about 0.50%.

In other examples of implementations of the process, the providing the concentrated milk composition includes providing the concentrated milk composition as having a concentration by weight of the milk protein being within a range of between about 5% and about 3%.

In some examples of implementations of the process, the providing the concentrated milk composition includes combining the concentrated milk composition together with a stabilizer.

In further examples of implementations of the process, the providing the plant fat composition includes providing the plant fat as derived from seeds or fruit of: soy, corn, canola, sunflower, safflower, olive, peanut, cottonseed, sesame, almond, apricot, avocado, coconut, flax, grapeseed, hazelnut, palm, palm kernel, pine, poppy, pumpkin, rice bran, tea, walnut, wheat, hemp, acai, cashew, chia, pecan, or hazelnut.

In additional examples of implementations of the process, the forming the concentrated milk-plant fat composition includes selecting the first amount of the concentrated milk composition and the second amount of the plant fat composition as causing the concentrated milk-plant fat composition to have a concentration by weight of water being within a range of between about 50% and about 55%.

In other examples of implementations of the process, the forming the concentrated milk-plant fat composition includes selecting the first amount of the concentrated milk composition and the second amount of the plant fat composition as causing the concentrated milk-plant fat composition to have a total concentration by weight of fat being within a range of between about 33% and about 16%.

In some examples of implementations of the process, the forming the concentrated milk-plant fat composition includes selecting the second amount of the plant fat composition as being less than or equal to about 60% by weight of the concentrated milk-plant fat composition In further examples of implementations of the process, the forming the concentrated milk-plant fat composition includes carrying out the combining the first amount of the concentrated milk composition together with the second amount of the plant fat composition with a difference between the first and second temperatures being about 5° F. or less.

In additional examples of implementations of the process, the providing the plant fat composition includes providing the plant fat composition at the second temperature as being within a range of between a pasteurization temperature and a temperature being about 20° F. above the melting point of the plant fat composition.

In other examples of implementations of the process, the providing the plant fat composition includes providing the plant fat composition at the second temperature as being within a range of between about 20° F. to about 40° F. above the melting point of the plant fat composition.

In some examples of implementations of the process, the providing the plant fat composition includes providing the plant fat composition at the second temperature as being within a range of between about 28° F. to about 33° F. above the melting point of the plant fat composition.

In further examples of implementations of the process, the providing the plant fat composition includes: providing the plant fat composition as containing palm oil having a melting point being within a range of between about 91° F. and about 102° F.; and providing the second amount of the plant fat composition at the second temperature as being within a range of between about 125° F. and about 130° F.

In additional examples of implementations, the process includes at least semi-continuously carrying out the forming the concentrated milk-plant fat composition.

In other examples of implementations, the process includes at least semi-continuously providing the concentrated milk composition and the plant fat composition; and then at least semi-continuously combining together batches each including the first amount of the concentrated milk composition and the second amount of the plant fat composition.

In some examples of implementations of the process, the directly setting the concentrated milk-plant fat composition includes adjusting the initial pH to the reduced pH as being within a range of between about 4.7 and about 4.6.

In further examples of implementations of the process, the forming the uniform non-separating direct-set milk-plant fat product includes forming the direct-set milk-plant fat product as having a concentration by weight of the milk protein being within a range of between about 5% and about 3%.

In additional examples of implementations of the process, the forming the direct-set milk-plant fat product includes forming the direct-set milk-plant fat product without any separating of the concentrated milk-plant fat composition into a curd and a whey.

In other examples of implementations of the process, the forming the direct-set milk-plant fat product includes forming the direct-set milk-plant fat product without any culturing of lactic acid-producing bacteria.

In some examples of implementations of the process, the forming the direct-set milk-plant fat product includes forming the direct-set milk-plant fat product as being substantially free of lactic acid.

In further examples of implementations, the process includes forming a uniform non-separating direct-set milk-plant fat product made according to the process.

In another example of an implementation, a composition is provided that includes: a uniform non-separating direct-set milk-plant fat product that includes a concentrated milk composition, a plant fat composition, and an edible acid; wherein the product has a concentration by weight of water being within a range of between about 49% and about 57%; and wherein the product has a concentration by weight of milk protein being within a range of between about 5% and about 3%.

In some examples of implementations of the composition, the product has a concentration by weight of water being within a range of between about 50% and about 55%.

In further examples of implementations of the composition, the product has a concentration by weight of milk fat being less than about 1%.

In additional examples of implementations of the composition, the plant fat is derived from seeds or fruit of: soy, corn, canola, sunflower, safflower, olive, peanut, cottonseed, sesame, almond, apricot, avocado, coconut, flax, grapeseed, hazelnut, palm, palm kernel, pine, poppy, pumpkin, rice bran, tea, walnut, wheat, hemp, acai, cashew, chia, pecan, or hazelnut.

In other examples of implementations of the composition, the product has a concentration by weight of the plant fat being within a range of between about 33% and about 16%.

In some examples of implementations of the composition, the product has a pH being within a range of between about 4.9 and about 4.5.

In further examples of implementations of the composition, the product has a pH being within a range of between about 4.7 and about 4.6.

In additional examples of implementations of the composition, the product is substantially free of lactic acid-producing bacteria.

In other examples of implementations of the composition, the edible acid includes phosphoric acid, acetic acid, lactic acid, or citric acid.

In some examples of implementations of the composition, the product is substantially free of lactic acid.

In further examples of implementations of the composition, the product includes a stabilizer.

In additional examples of implementations of the composition, the product has less than about 1% by weight of phase separation after 15 hours at a temperature within a range of between about 74° F. and about 75° F.

Other processes, products, features and advantages of the invention will be or will become apparent to one with skill in the art upon examination of the following FIGURES and detailed description. It is intended that all such additional processes, products, features and advantages be included within this description, be within the scope of the invention, and be protected by the accompanying claims.

BRIEF DESCRIPTION OF THE FIGURES

The invention can be better understood with reference to the following FIGURE.

DETAILED DESCRIPTION

Processes are provided herein that include: providing a concentrated milk composition including milk protein; providing a plant fat composition including plant fat; combining a first amount of the concentrated milk composition together with a second amount of the plant fat composition, forming a concentrated milk-plant fat composition having an initial pH and having a concentration by weight of water being within a range of between about 49% and about 57%; combining the concentrated milk-plant fat composition together with an amount of an edible acid, and directly setting the concentrated milk-plant fat composition; thereby forming a uniform non-separating direct-set milk-plant fat product substantially retaining the milk protein. In the processes, combining together the first amount of the concentrated milk composition and the second amount of the plant fat composition includes providing such compositions respectively at first and second temperatures being at least about 20 degrees Fahrenheit (° F.) above the melting points of the compositions. Furthermore in the processes, directly setting the concentrated milk-plant fat composition includes adjusting an initial pH to a reduced pH being within a range of between about 4.9 and about 4.5. The combination of these steps together in the processes provided herein may facilitate making the direct-set milk-plant fat product as being uniform, meaning that there is a single, homogeneous phase; and as having a viscosity and body comparable to that of conventional cream cheese. For example, forming the concentrated milk-plant fat composition as having a concentration by weight of water being within a range of between about 49% and about 57% may facilitate forming the resulting direct-set milk-plant fat product as having such a concentration by weight of water being conducive to forming a single, homogeneous phase having such a viscosity and body. Further, for example, providing the concentrated milk composition and the plant fat composition at first and second temperatures being at least about 20° F. above respective melting points of the compositions may facilitate combining such compositions together as forming such a single, homogeneous phase. As examples, providing the concentrated milk composition and the plant fat composition at such temperatures may minimize agglomeration or precipitation of the plant fat composition during the combining or later in the processes. The combination of these steps together in the processes provided herein may also facilitate making the direct-set milk-plant fat product as being non-separating, meaning that the product generally remains substantially as a single, homogeneous phase, having less than about 1% by weight of phase separation after 15 hours at a temperature within a range of between about 74° F. and about 75° F.

Processes that include one or more deviations from the steps of the processes herein may yield a direct-set milk-plant fat product of inferior quality. For example, modifying the processes herein by forming the concentrated milk-plant fat composition as having a concentration by weight of water being less than about 49% may cause the resulting direct-set milk-plant fat product to have a rubbery texture due to the presence of inadequate water. Furthermore, modifying the processes herein by forming the concentrated milk-plant fat composition as having a concentration by weight of water being more than about 57% may cause the resulting direct-set milk-plant fat product to have an excessively moist, soft, runny texture due to the presence of too much water. As additional examples, deviations from the processes herein that include combining the concentrated milk composition together with the plant fat composition while the concentrated milk composition and the plant fat composition do not both have temperatures being at least about 20° F. above their respective melting points may cause the plant fat composition to form a globular gel phase remaining separate from another phase of the concentrated milk composition. Moreover, subsequently heating the concentrated milk-plant fat composition to a temperature at least about 20° F. above the respective melting points of both the concentrated milk composition and the plant fat composition after the combining may be ineffective in eliminating these phase separations by then causing such two separate phases to be combined together into a single, homogeneous phase. In a further example, a deviation from the processes herein that includes combining the concentrated milk composition and the plant fat composition together with an additional composition such as an additional fat source, while the concentrated milk composition and the plant fat composition and the additional composition do not all have temperatures being at least about 20° F. above their respective melting points, may result in agglomeration of or precipitation of the plant fat composition or of the additional fat source or other additional composition, resulting in a phase separation between or a failure to form a single phase including the concentrated milk composition, the plant fat composition, and the additional fat source or other additional composition.

In some examples of the processes, forming the concentrated milk-plant fat composition may include carrying out the combining together of the first amount of the concentrated milk composition with the second amount of the plant fat composition where a difference between the first and second temperatures is about 5° F. or less. Providing the concentrated milk composition and the plant fat composition at first and second temperatures where a difference between the first and second temperatures is about 5° F. or less may facilitate combining such compositions together as forming such a single, homogeneous phase, and may contribute to minimizing agglomeration or precipitation of the plant fat composition during the combining or later in the processes. Where an example of the processes herein is carried out with a difference between the first and second temperatures being greater than about 5° F., the plant fat composition may be caused to agglomerate or precipitate, resulting in a phase separation between or a failure to form a single phase including the concentrated milk composition and the plant fat composition. Moreover, subsequently heating the concentrated milk-plant fat composition to a temperature at least about 20° F. above the respective melting points of the concentrated milk composition and the plant fat composition after the combining may be ineffective in eliminating these phase separations by then causing such two separate phases to be combined together into a single, homogeneous phase. In a further example where the concentrated milk composition and the plant fat composition are combined together with an additional fat source or other additional composition being at a third temperature that differs from either or both of the first and second temperatures by more than about 5° F., then the additional fat source or other additional composition may be caused to agglomerate or precipitate, resulting in a phase separation between or a failure to form a single phase including the concentrated milk composition, the plant fat composition, and the additional fat source or other additional composition.

In some examples of the processes, providing the concentrated milk composition may include combining the composition together with a stabilizer. Combining a stabilizer with the concentrated milk composition may, for example, contribute to forming the direct-set milk-plant fat product as substantially retaining the milk protein included in the concentrated milk composition, the product thus being uniform and non-separating. Where an example of the processes herein is carried out without combining a stabilizer together with the concentrated milk composition, the resulting direct-set milk-plant fat product may, in some cases, exhibit syneresis. Throughout this specification, the term "syneresis" means a failure of some of the milk proteins to form a single, homogeneous phase with the concentrated milk-plant fat composition, or a gradual and ongoing phase separation of a liquid that contains milk proteins from the direct-set milk-plant fat product. In some cases, this syneresis may be irreversible or difficult to overcome.

Figure 1:
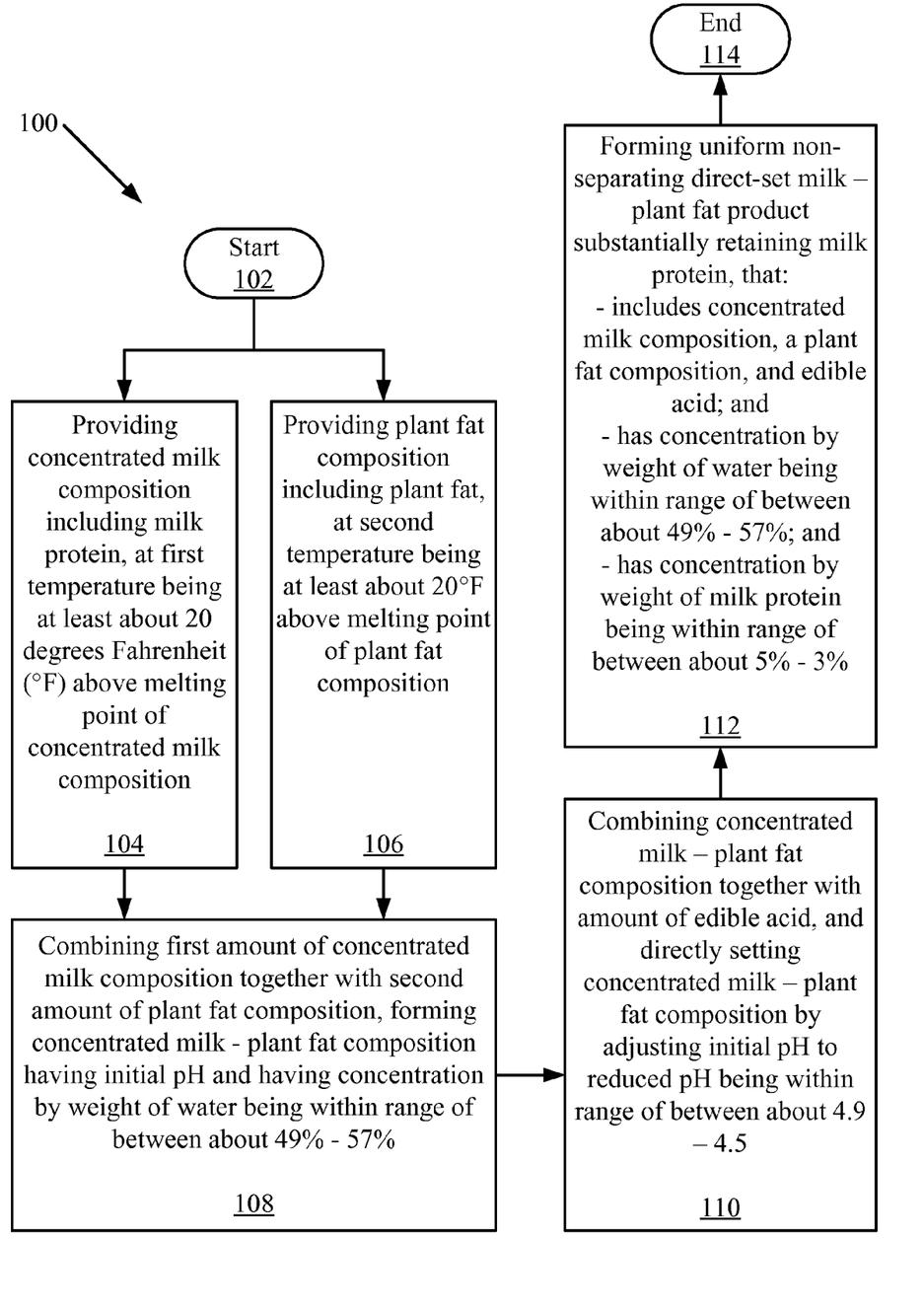
FIG. 1 is a flow chart showing an example of an implementation of a process [100] for making a direct-set milk-plant fat product.

FIG. 1 is a flow chart showing an example of an implementation of a process [100] for making a uniform non-separating direct-set milk-plant fat product. The process [100] starts at step [102].

At step [104] of the process [100], a concentrated milk composition is provided, the concentrated milk composition including milk protein. Throughout this specification, all concentrations are expressed by weight, and all weights and concentrations are measured and expressed at an ambient room temperature of about 70° F. and a pressure of one standard atmosphere (760 Torr). Throughout this specification, all temperatures are also measured at a pressure of one standard atmosphere.

Throughout this specification, the term "milk composition" means an aqueous composition having components that include water, lactose sugars, milk fat and milk protein, wherein the aqueous composition includes one or more sources of such milk fat and milk protein, examples of such sources including aqueous, condensed, dry or reconstituted raw-, whole-, reduced-fat- or nonfat-milk, or cream. As an example, these sources may be derived from cow milk. Among these sources of milk fat and milk protein are, as examples: raw milk, cream, whole milk, reduced-fat milk, skim (non-fat) milk, non-fat dry milk ("NFDM"), dry cream, dry whole milk, dry reduced-fat milk, dry nonfat milk, condensed cream, condensed whole milk, condensed reduced-fat milk, condensed nonfat milk, and reconstituted milk. Throughout this specification, the term "fat" means a composition including triglycerides, triacylglycerols, diglycerides, monoacylglycerols, or fatty acids. Throughout this specification, the term "milk fat" means the lipid components of edible milk, for example, of cow milk. These lipids may include, as examples, triacylglycerols, diglycerides, and monoacylglycerols. Throughout this specification, the term "milk protein" means the combined protein components of edible milk, for example, of cow milk. Throughout this specification, the terms "casein protein" and "whey protein" mean the casein protein and whey protein components of edible milk, for example, of cow milk.

Throughout this specification, the term "concentrated milk composition" means a milk composition having a concentration by weight of water being selected so that the concentrated milk-plant fat composition formed at step [108] has a concentration by weight of water being within a range of between about 49% and about 57%. In examples, providing the concentrated milk composition in step [104] of the process [100] may include providing the concentrated milk composition as including a concentrated milk protein source. Throughout this specification, the term "concentrated milk protein source" means a composition having components that include casein protein or whey protein or both casein protein and whey protein, wherein the composition contains more milk protein than whole milk. Throughout this specification, the terms "casein protein" and "whey protein" mean the protein components of edible milk, for example, of cow milk. In examples, providing the concentrated milk composition at step [104] of the process [100] may include providing a concentrated milk protein source including: aqueous nonfat (skim) milk; condensed nonfat milk; dry nonfat milk; or reconstituted nonfat milk. Examples of concentrated milk protein sources include the following, which may be in aqueous form, in condensed aqueous form, in dry form, or in reconstituted aqueous form: nonfat milk; whey protein concentrate ("WPC"); casein protein and whey protein concentrate ("MPC"); whole casein protein; whole whey protein; acid whey protein; casein protein curd; and whey protein curd. Throughout this specification, the term "reconstituted" means an aqueous milk composition including a dry milk component having been combined together with water. Nonfat dry milk may also be referred to as "NFDM". As examples, NFDM may be reconstituted by combining the NFDM together with water or with aqueous nonfat milk. WPC and MPC may be produced, as examples, by ultrafiltration of a milk composition. WPC compositions having protein concentrations by weight of about 30%, about 50%, and about 85%, as examples, may be commercially available. As an example, these concentrated milk protein sources may be derived from cow milk. Further, for example, one or more concentrated milk protein sources may be utilized in combination together in providing the concentrated milk composition. In additional examples, providing the concentrated milk composition may include providing the concentrated milk composition as having a concentration by weight of milk fat being less than about 1%; or as having a concentration by weight of milk fat being within a range of between about 0.99% and about 0.50%. As further examples, providing the concentrated milk composition may include providing the concentrated milk composition as having a concentration by weight of the milk protein being: within a range of between about 5% and about 3%; or within a range of between about 4.0% and about 3.5%.

The concentration by weight of water in a milk composition may be quantitatively determined, for example, by measured microwave dielectric spectra. For example, the concentration by weight of water in a milk composition may be quantitatively determined, by utilizing a SMART System5 Microwave Moisture/Solids Analyzer as may be commercially available from CEM Corporation, having an address at 3100 Smith Farm Road, Matthews, N.C. 28104 USA; www.cem.com. As another example, methods for determining the water content of foods by microwave dielectric spectra that may be utilized are disclosed in: Daschner, F. et al., "Optimization of the microwave determination of water in foods using principal component analysis," Instrumentation and Measurement Technology Conference 2000 (IMTC 2000; Proceedings of the $17^{th}$ IEEE), May 1-4, 2000, Vol. 1 pp. 12-16, version published 6 Aug. 2002, the entirety of which hereby is incorporated herein by reference. The concentration by weight of milk fat in a milk composition may be measured, for example, using the Gerber test, as defined in "GEA Niro Method No. A 9 b, "Total Fat by Gerber/Teichert", revised September 2005, published on-line at www.niro.com, the entirety of which hereby is incorporated herein by reference. The concentration of milk fat in a milk composition may also be measured, for example, using a standard Babcock test. For background, see Baldwin, R. J., "The Babcock Test," Michigan Agricultural College, Extension Division, Bulletin No. 2, Extension Series, March 1916, pp. 1-11; the entirety of which hereby is incorporated herein by reference. The concentration by weight of milk protein in a milk composition may be measured, for example, using the "Protein Nitrogen Content of Milk Kjeldahl Direct Method", June 1991, published on-line by the United States Department of Agriculture at www.fmmaseattle.com, the entirety of which hereby is incorporated herein by reference.

Step [104] of the process [100] further includes providing the concentrated milk composition at a first temperature being at least about 20° F. above a melting point of the concentrated milk composition. Throughout this specification, the term "melting point" means the temperature at which or the range of temperatures over which the physical state of a composition changes from being a solid to being a liquid. For example, palm oil generally has a melting point within or over a range of between about 91° F. and about 102° F. As further examples, step [104] of the process [100] may include: heating a concentrated milk composition to the first temperature being at least about 20° F. above the melting point of the concentrated milk composition; or heating water to the first temperature and then combining NFDM or another concentrated milk protein source with the heated water.

In examples, providing the concentrated milk composition at step [104] of the process [100] may include combining the concentrated milk composition together with a stabilizer. As examples, a stabilizer may be combined together with water, or with a concentrated milk protein source, in providing the concentrated milk composition. Combining a stabilizer with the concentrated milk composition at step [104] of the process [100] may, for example, contribute to causing the direct-set milk-plant fat product to substantially retain the milk protein that is included in the concentrated milk composition, the product thus being uniform and non-separating. Furthermore, combining a stabilizer with the concentrated milk composition at step [104] may, for example, contribute to minimizing the development of syneresis in the resulting direct-set milk-plant fat product. Where the process [100] is carried out without including the combining of a stabilizer with the concentrated milk composition at step [104], the resulting direct-set milk-plant fat product may, in some cases, exhibit syneresis, which may be irreversible or difficult to overcome. For example, step [104] of the process [100] may include providing the concentrated milk composition as including a concentration by weight of a stabilizer being: within a range of between about 0.25% and about 0.40%; or within a range of between about 0.30% and about 0.35%. Examples of types of stabilizers that may be utilized include gums and salts. Suitable gums include, for example, locust bean gum, xanthan gum, guar gum, gum Arabic, and carageenan. Suitable salts include, for example, sodium chloride and potassium chloride. As an example, the stabilizer may include K6B493, which is a milled, dry product that may be commercially available from CP Kelco US, Inc., 1313 North Market Street, Wilmington, Del. 19894-0001. In further examples, the stabilizer may include a blend of xanthan gum, locust bean gum and guar gum. Suitable gum compositions may be commercially available from TIC Gums Inc., Belcamp, Md.

At step [106] of the process [100] a plant fat composition is provided, including plant fat. Step [106] of the process [100] further includes providing the plant fat composition at a second temperature being at least about 20° F. above a melting point of the plant fat composition. Throughout this specification, the term "plant fat" means an edible plant-derived fat. Plant fats may for example include triglycerides, which are tri-esters of glycerol and fatty acids. A plant fat having a melting point at or below an ambient room temperature may also be referred to as being a "plant oil." In general, plant oils, as well as other plant fats having melting points above ambient room temperatures, may be utilized in step [104] of the process [100]. As examples, the plant fat composition may include one or more plant fats each having melting points being at or below about 75° F. Throughout this specification, the term "plant fat composition" means an edible plant-derived composition that includes a plant fat. A plant fat composition may include, as examples, a total concentration by weight of one or more plant fats being within a range of between about 85% and about 100%; or being about 100%. Examples of plant fats that may be utilized in step [104] herein include plant fats derived from seeds or fruit of: soy, corn, canola, sunflower, safflower, olive, peanut, cottonseed, sesame, almond, apricot, avocado, coconut, flax, grapeseed, hazelnut, palm, palm kernel, pine, poppy, pumpkin, rice bran, tea, walnut, wheat, hemp, acai, cashew, chia, pecan, or hazelnut.

At step [108] of the process [100], a first amount of the concentrated milk composition is combined together with a second amount of the plant fat composition, forming a concentrated milk-plant fat composition. Further in step [108], the first amount of the concentrated milk composition and the second amount of the plant fat composition are selected as causing the concentrated milk-plant fat composition to have a concentration by weight of water being within a range of between about 49% and about 57%. Throughout this specification, the term "total solids" designates the components of an aqueous composition that remain after subtraction of the water from the composition. Accordingly, in step [108] of the process [100], the first amount of the concentrated milk composition and the second amount of the plant fat composition are likewise selected as causing the concentrated milk-plant fat composition to have a corresponding concentration by weight of total solids being within a range of between about 51% and about 43%. As an example, forming the concentrated milk-plant fat composition at step [108] as having a concentration by weight of water being at least about 49% may avoid forming the direct-set milk-plant fat product as having a rubbery texture due to the presence of inadequate water. Further, for example, forming the concentrated milk-plant fat composition at step [108] as having a concentration by weight of water being about 57% or less may avoid forming the direct-set milk-plant fat product as having an excessively moist, soft, runny texture due to the presence of too much water. In additional examples, the first amount of the concentrated milk composition and the second amount of the plant fat composition may be selected as causing the concentrated milk-plant fat composition to have: a concentration by weight of water being within a range of between about 50% and about 55%; and a corresponding concentration by weight of total solids being within a range of between about 50% and about 45%. The concentration by weight of water in the concentrated milk-plant fat composition may be quantitatively determined, for example, by measured microwave dielectric spectra. For example, the concentration by weight of water in the concentrated milk-plant fat composition may be quantitatively determined by utilizing a SMART System5 Microwave Moisture/Solids Analyzer as earlier discussed. The concentration by weight of water in the concentrated milk-plant fat composition may also be qualitatively correlated with the firmness of the concentrated milk-plant fat composition. Firmness of the concentrated milk-plant fat composition may be determined in accordance with the American Oil Chemists' Society ("AOCS") Official Method Cc—16-60, utilizing a penetrometer. For example, a Humboldt H-1200 Penetrometer may be utilized.

In further examples, forming the concentrated milk-plant fat composition in step [108] of the process [100] may include selecting the first amount of the concentrated milk composition, and selecting the second amount of the plant fat composition, as causing the concentrated milk-plant fat composition to have a total concentration by weight of fat, which may include milk fat in addition to the plant fat, being within a range of between about 33% and about 16%. In an additional example, forming the concentrated milk-plant fat composition at step [108] of the process [100] may include selecting the second amount of the plant fat composition as being less than or equal to about 60% by weight of the concentrated milk-plant fat composition. Forming a concentrated milk-plant fat composition including a plant fat composition at a concentration by weight of greater than about 60% may cause a residual portion of the plant fat composition to agglomerate, precipitate, or settle out of the concentrated milk-plant fat composition or otherwise form a phase being separated from a phase of the concentrated milk composition during the process [100]. As further examples, the second amount of the plant fat composition may be selected as being less than or equal to about 55% by weight, or as being within a range of between about 50% by weight and about 55% by weight, of the concentrated milk-plant fat composition.

In examples, forming the concentrated milk-plant fat composition at step [108] may include: carrying out the combining of the first amount of the concentrated milk composition at the first temperature, together with the second amount of the plant fat composition at the second temperature, with a difference between the first and second temperatures being about 5° F. or less. Providing the concentrated milk composition and the plant fat composition respectively being at first and second temperatures, with a difference between the first and second temperatures being about 5° F. or less, may facilitate combining such compositions together. For example, providing the concentrated milk composition and the plant fat composition at such temperatures may minimize, during the combining or later in the process [100], agglomeration or precipitation of the plant fat composition. As examples, where the first and second temperatures are not at least about 20° F. above the respective melting points of the compositions or where the first temperature is more than about 5° F. above or below the second temperature, then the plant fat composition may form a globular gel phase remaining separate from the concentrated milk composition. In further examples of the process [100], providing the plant fat composition at step [106] may include providing the plant fat composition at the second temperature as being within a range of between a pasteurization temperature and a temperature being about 20° F. above the melting point of the plant fat composition. Throughout this specification, the term "pasteurization temperature" generally means a temperature within a range of between about 150° F. and about 170° F. In those further examples, providing the concentrated milk composition at step [104] may likewise include providing the concentrated milk composition at the first temperature as being within a range of between a pasteurization temperature and a temperature being about 20° F. above the melting point of the concentrated milk composition; and a difference between the first and second temperatures may be about 5° F. or less. In additional examples of the process [100], providing the plant fat composition at step [106] may include providing the plant fat composition at the second temperature as being: within a range of between about 20° F. to about 40° F. above the melting point of the plant fat composition, or within a range of between about 28° F. to about 33° F. above the melting point of the plant fat composition. In those additional examples, providing the concentrated milk composition at step [104] may likewise include providing the concentrated milk composition at the first temperature as being: within a range of between about 20° F. to about 40° F. above the melting point of the concentrated milk composition, or within a range of between about 28° F. to about 33° F. above the melting point of the concentrated milk composition; and a difference between the first and second temperatures may be about 5° F. or less. In other examples of the process [100], providing the plant fat composition at step [106] may include providing the plant fat composition as containing palm oil having a melting point being within a range of between about 91° F. and about 102° F.; and may include providing the second amount of the plant fat composition at the second temperature as being within a range of between about 125° F. and about 130° F., or as being about 128° F. In those other examples, providing the concentrated milk composition at step [104] may likewise include providing the concentrated milk composition at the first temperature as being within a range of between about 125° F. and about 130° F., or as being about 128° F.

In step [108] of the process [100], the combining is carried out with the concentrated milk composition and the plant fat composition being respectively at the first and second temperatures. Step [108] may include, for example, mixing together the concentrated milk composition and the plant fat composition. For example, combining the first amount of the concentrated milk composition together with the second amount of the plant fat composition may include adding the amount of the plant fat composition to the amount of the concentrated milk composition. As an example, the plant fat composition may be gradually mixed into the concentrated milk composition. The mixing may, for example, further include homogenizing the resulting concentrated milk-plant fat composition by subjecting it simultaneously to an elevated pressure and temperature. In an example, the concentrated milk-plant fat composition may be homogenized for about two (2) seconds in a single-stage homogenization step under a pressure within a range of between about one thousand (1,000) pounds per square inch ("PSI") and about five thousand (5,000) PSI, or a pressure of about three thousand (3,000) PSI. As the selected pressure to be applied to the concentrated milk-plant fat composition is increased, the resulting viscosity of the concentrated milk-plant fat composition and of the final direct-set milk-plant fat product may also accordingly increase. The elevated pressure may be generated by hydraulic or mechanical force, as examples. In one example, homogenization may include confining the concentrated milk-plant fat composition at a selected pressure in a closed pressurized chamber and then allowing the concentrated milk-plant fat composition to escape from the chamber through an orifice to quickly release the pressure. For example, a Gaulin homogenizer may be utilized. In general, carrying out the homogenization at an elevated temperature such as at the first or second temperature may increase the fluidity of the concentrated milk-plant fat composition, thereby improving the flow of the concentrated milk-plant fat composition out from the pressurized chamber.

In an example, homogenizing the concentrated milk-plant fat composition at step [108] may be carried out utilizing a homogenizer apparatus having an inlet chamber, a homogenization chamber, and an outlet chamber. In this example, the inlet chamber may be a vessel suitable for staging a supply of the concentrated milk-plant fat composition, on a continuous or batch basis, for introduction into the homogenization chamber. The homogenization chamber in this example may be a vessel having controllable orifices for input and output of the concentrated milk-plant fat composition, and may be reinforced to withstand containment of an elevated pressure suitable for homogenization. Further in this example, the outlet chamber may be a vessel suitable for staging a supply of the homogenized concentrated milk-plant fat composition, on a continuous or batch basis, for further processing. In operation of this example of a homogenizer apparatus, the concentrated milk-plant fat composition may pass through the inlet chamber before being pumped into the homogenization chamber. Following homogenization, the concentrated milk-plant fat composition may be expelled from the homogenization chamber into the outlet chamber. For example, these flows may be carried out on a continuous basis, although a batch process may also be done. A pressure within the homogenization chamber may, for example, be adjusted to a selected homogenization pressure and so maintained during homogenization. The pressure in the inlet chamber may be, for example, within a range of between about twenty (20) PSI and about forty (40) PSI, generated by pumping of the concentrated milk-plant fat composition into the inlet chamber. Similarly, the pressure in the outlet chamber may be, for example, within a range of between about twenty (20) PSI and about forty (40) PSI, generated by expelling the concentrated milk-plant fat composition from the homogenization chamber and then containing it in the outlet chamber. The concentrated milk-plant fat composition may undergo a pressure drop upon passing from the homogenization chamber to the outlet chamber, by ejection through an orifice, such as for example an orifice having a diameter of about a centimeter. The pressures within the inlet chamber, outlet chamber and homogenization chamber may be carefully controlled, as an example, to avoid entrainment of air into the homogenization chamber. Air entrainment into the homogenization chamber may cause cavitation, which may degrade the concentrated milk-plant fat composition and may potentially lead to an explosive release of the homogenization pressure.

As another example, step [108] of the process [100] may include at least semi-continuously, or continuously, carrying out the forming of the concentrated milk-plant fat composition. For example, step [104] of the process [100] may include at least semi-continuously or continuously providing the concentrated milk composition; step [106] may include at least semi-continuously or continuously providing the plant fat composition; and step [108] may include at least semi-continuously or continuously combining together batches each including the first amount of the concentrated milk composition and the second amount of the plant fat composition. In this manner, the process [100] may be carried out, for example, on a continuous or semi-continuous series of multiple batches each including the first amount of the concentrated milk composition and the second amount of the plant fat composition.

In another example, step [108] of the process [100] may include pasteurizing the concentrated milk-plant fat composition. As a further example, step [104] may include pasteurizing the concentrated milk composition, and step [106] may include pasteurizing the plant fat composition. In additional examples, the concentrated milk-plant fat composition or the direct-set milk-plant fat product may be pasteurized at any other point in the process [100]. Pasteurization of the concentrated milk-plant fat composition, or pasteurization separately of the concentrated milk composition and the plant fat composition, may for example be generally useful to prevent spoilage of such compositions or of the resulting direct-set milk-plant fat product that may otherwise be caused by unintended growth of the wild bacteria and other microbes normally present in unpasteurized milk compositions and which may also be present in unpasteurized plant fat compositions. Effective pasteurization is a function of both time and temperature; pasteurization may be completed at higher temperatures in correspondingly shorter times. As examples, pasteurization of the concentrated milk-plant fat composition may be carried out by a vat process at a temperature within a range of between about 150° F. and about 170° F., or for example at about 155° F., for about thirty (30) minutes; or at a temperature of about 165° F. for about twenty (20) minutes. High temperature short time pasteurization, in which the concentrated milk-plant fat composition is pumped through an in-line tube within a temperature-controlled shell, may also be utilized. For example, high temperature/short time pasteurization may be carried out at a temperature of about 170° F. for a time period of about seventeen (17) seconds. The pasteurization may, for example, be carried out with agitation of the concentrated milk-plant fat composition to facilitate uniform heating throughout the concentrated milk-plant fat composition. In general, moderate agitation is utilized to avoid excessive shear which may degrade the concentrated milk-plant fat composition. The force applied by the agitation should not be so strong as to substantially shear and thus degrade the milk protein and plant fat in the concentrated milk-plant fat composition. In examples, the pasteurization may be carried out in a tank equipped with a heater and agitator, such as a Groen kettle.

Step [110] of the process [100] includes combining the concentrated milk-plant fat composition together with an amount of an edible acid, and directly setting the concentrated milk-plant fat composition by adjusting an initial pH of the concentrated milk-plant fat composition to: a reduced pH being within a range of between about 4.9 and about 4.5. In examples, the direct setting of the concentrated milk-plant fat composition may include adjusting the initial pH of the concentrated milk-plant fat composition to a reduced pH being within a range of between about 4.7 and about 4.6. Throughout this specification, the term "initial pH" means the pH of the concentrated milk-plant fat composition formed at step [108] of the process [100]. As an example, the initial pH of the concentrated milk-plant fat composition may be within a range of between about 6.8 and about 6.2. The pH of the concentrated milk-plant fat composition may be monitored using a pH meter, such as a Fisher Scientific pH meter. Throughout this specification, the term "directly setting" means directly acidifying the concentrated milk-plant fat composition by combining the concentrated milk-plant fat composition together with an edible acid, thereby causing coagulation of the concentrated milk-plant fat composition. Examples of suitable edible acids that may be utilized for directly acidifying the concentrated milk-plant fat composition include lactic acid, phosphoric acid, acetic acid, and citric acid. For example, vinegar, being an aqueous solution of acetic acid, may be utilized. In an example, an aqueous mixture of edible acids that may be utilized, having a pH within a range of between about 0.08 and about 1.4, may be commercially available under the trade name Stabilac® 12 Natural from the Sensient Technologies Corporation, 777 East Wisconsin Avenue, Milwaukee, Wis. 53202-5304. As another example, similar edible acid mixtures may also be commercially available from Degussa Corporation, 379 Interpace Parkway, P.O. Box 677, Parsippany, N.J. 07054-0677.

The direct setting of the concentrated milk-plant fat composition in step [110] of the process [100] may be carried out, for example, in a set tank internally equipped with a scraped surface agitator to ensure rapid and thorough mixing together of the edible acid and the concentrated milk-plant fat composition. Agitation may, as an example, be discontinued upon reaching a selected final pH for the concentrated milk-plant fat composition being within the range of between about 4.9 and about 4.5, to avoid excessively shearing and possibly breaking down the viscosity of the concentrated milk-plant fat composition. As examples, the direct setting may be carried out at a temperature being: within a range of between about 155° F. and about 170° F.; or at about 165° F. In another example, the direct setting may be carried out at a relatively reduced temperature, such as a temperature within a range of between about 75° F. and about 60° F. However, the viscosity of the concentrated milk-plant fat composition may generally increase as the temperature is reduced, which may impede mixing together of the edible acid and the concentrated milk-plant fat composition. Accordingly, carrying out the direct setting at a temperature below about 60° F. may cause the concentrated milk-plant fat composition to have a lumpy texture. Cooling can be effected, for example, using jacketed tanks containing a glycol refrigerant maintained at a selected temperature to withdraw heat from the concentrated milk-plant fat composition in the tank.

As another example, step [110] of the process [100] may include at least semi-continuously, or continuously, carrying out the combining of the concentrated milk-plant fat composition together with an edible acid and directly setting the concentrated milk-plant fat composition. In this manner, the process [100] may be carried out, for example, on a continuous or semi-continuous series of multiple batches of the concentrated milk-plant fat composition each including the first amount of the concentrated milk composition and the second amount of the plant fat composition.

Upon completion of the direct setting of the concentrated milk-plant fat composition at step [110], the process [100] includes at step [112] thereby forming a direct-set milk-plant fat product substantially retaining the milk protein that was included in the first amount of the concentrated milk composition provided at step [104]. The process [100] may then end at step [114]. In general, the direct-set milk-plant fat product is uniform, non-separating, and has a viscosity and body comparable to that of conventional cream cheese. Throughout this specification, the term "uniform" means that the direct-set milk-plant fat product has a single, homogeneous phase. Throughout this specification, the term "non-separating" means that the direct-set milk-plant fat product remains substantially as a single, homogeneous phase for at least about 15 hours after being formed, then exhibiting less than about 1% by weight of phase separation at a temperature within a range of between about 74° F. and about 75° F. Throughout this specification, "substantially retaining" means that the uniform direct-set milk-plant fat product contains at least about 90% by weight of and may contain more than 99.9% by weight of the milk protein that was included in the first amount of the concentrated milk composition provided at step [104]. Accordingly, providing the concentrated milk composition at step [104] may include providing the concentrated milk composition as having a concentration by weight of the milk protein being within a range of between about 5% and about 3%; and forming the uniform non-separating direct-set milk-plant fat product at step [110] may include forming the direct-set milk-plant fat product as likewise having a concentration by weight of the milk protein being within the range of between about 5% and about 3%. In further examples, providing the concentrated milk composition at step [104] may include providing the concentrated milk composition as having a concentration by weight of the milk protein being within a range of between about 4.0% and about 3.5%; and forming the uniform non-separating direct-set milk-plant fat product at step [110] may include forming the direct-set milk-plant fat product as likewise having a concentration by weight of the milk protein being within the range of between about 4.0% and about 3.5%. In an example, the process [100] may include forming the direct-set milk-plant fat product without any separating of the concentrated milk-plant fat composition into a curd and a whey.

In an example discussed earlier, forming the concentrated milk-plant fat composition in step [108] of the process [100] may include selecting the first amount of the concentrated milk composition, and selecting the second amount of the plant fat composition, as causing the concentrated milk-plant fat composition to have a total concentration by weight of fat, which may include milk fat in addition to the plant fat, being within a range of between about 33% and about 16%. In that example, the resulting direct-set milk-plant fat product generally also has a similar total concentration by weight of fat being within a range of between about 33% and about 16%. The direct-set milk-plant fat product having a concentration by weight of fat being within a range of between about 33% and about 16% may, for example, be utilized as an extender to be combined together with another cheese product. For example, such a direct-set milk-plant fat product may be combined together with a cultured cream cheese-type product having the same concentration, or a different concentration, of fat. Throughout this specification, the term "cultured cream cheese-type product" means a composition that includes a milk composition having been inoculated with live and active lactic acid-producing mesophilic bacteria and subjected to culturing of such bacteria thereby forming lactic acid in the milk composition. Processes that may be utilized for combining the direct-set milk-plant fat product together with a cultured cream cheese-type product are disclosed in the concurrently-filed and commonly-owned U.S. patent application entitled "Cream Cheese-Type Compositions," the entirety of which hereby is incorporated herein by reference. Cultured cream cheese-type products that may be so combined together with the direct-set milk-plant fat product are disclosed in the concurrently-filed and commonly-owned U.S. patent application entitled "Milk-Plant Fat Curd Cheese," the entirety of which hereby is incorporated herein by reference.

In a further example, step [112] of the process [100] may include combining the direct-set milk-plant fat product together with a salt. The direct-set milk-plant fat product and the salt may, as an example, be combined together at an elevated temperature, such as the same temperature as may have been utilized for homogenization during step [110] as earlier discussed, or for example at about 165° F. Suitable salts include, as examples, sodium chloride and potassium chloride. For example, a salt may be combined with the direct-set milk-plant fat product at a concentration, by weight, being within a range of between about 0.25% and about 0.45% of the direct-set milk-plant fat product; or at a concentration, by weight, being within a range of between about 0.3% and about 0.4% of the direct-set milk-plant fat product. As another example, step [112] of the process [100] may include mixing together the salt and the direct-set milk-plant fat product. Step [112] of the process [100] may further include packaging the direct-set milk-plant fat product while still at an elevated temperature, and then reducing the temperature of the direct-set milk-plant fat product to a suitable refrigeration temperature, such as, for example, a temperature within a range of between about 34° F. and about 38° F. In another example, step [112] of the process [100] may alternatively include reducing the temperature of the direct-set milk-plant fat product to a suitable refrigeration temperature prior to packaging the direct-set milk-plant fat product.

In a further example, step [112] of the process [100] may include adding a suitable preservative to the direct-set milk-plant fat product to retard growth of bacteria, yeast and mold. For example, potassium sorbate, sodium benzoate, sorbic acid, ascorbic acid or nisin may be added. Nisin, for example, is a protein expressed by *Lactococcus lactis*. Further, for example, flavorings, condiments and the like may be added to the direct-set milk-plant fat product.

In further examples, step [112] may include subjecting the direct-set milk-plant fat product to a whipping process to modify the direct-set milk-plant fat product to have a whipped, more easily spreadable consistency. Information as to suitable procedures for carrying out such whipping processes is disclosed in commonly-owned U.S. patent application Ser. No. 11/454,756, filed on Jun. 16, 2006, entitled "Cream Cheese Products and Methods of Making the Same," the entirety of which hereby is incorporated herein by reference.

As an example, the process [100] may include forming the direct-set milk-plant fat product without any culturing of lactic acid-producing bacteria. For example, the process [100] may be carried out without inoculating the concentrated milk composition, or the concentrated milk-plant fat composition, with live and active lactic acid-producing bacteria; and without culturing lactic acid-producing bacteria in the concentrated milk composition, or in the concentrated milk-plant fat composition, or at any other step of the process [100]. Such bacteria generally digest lactose sugars present in milk compositions, thereby producing lactic acid. In this example of the process [100], the direct-set milk-plant fat product is formed as being coagulated solely by direct acidification with the edible acid at step [110]; and without any acidification caused by lactic acid formed by culturing of lactic acid-producing bacteria. Further in this example of the process [100], an edible acid other than lactic acid may be selected for utilization in step [110], such as phosphoric acid, acetic acid, or citric acid. Accordingly, forming the concentrated milk-plant fat composition at step [108] of the process [100] may include forming the concentrated milk-plant fat composition as being substantially free of lactic acid; and step [112] may include forming the direct-set milk-plant fat product being substantially free of lactic acid. Throughout this specification, the term "substantially free of lactic acid" means that the composition or product has a concentration by weight of lactic acid being less than about 0.01%. As examples, lactic acid-producing bacteria that are typically utilized for digesting lactose sugars present in milk compositions may include mesophilic or thermophilic bacteria of a strain that includes: Lactococcus lactis lactis, Lactococcus lactis cremoris, Lactococcus-lactis-lactis-diacetylactis, Leuconostoc mesenteroides cremoris, Streptococcus thermophilus, Lactobacillus acidophilus, Lactobacillus helveticus, Lactobacillus-delbrueckii-bulgaricus, Streptococcus-salivarius-thermophilus, Bifidobacterium-longum, Bifidobacterium-infantis, Lactobacillus-casei-casei, or Lactobacillus-paracasei-casei.

In an example of an implementation, the process [100] may be utilized to form a composition that includes a uniform non-separating direct-set milk-plant fat product, including a concentrated milk composition, a plant fat composition, and an edible acid. The direct-set milk-plant fat product has a concentration by weight of water being within a range of between about 49% and about 57%. The direct-set milk-plant fat product has a corresponding concentration by weight of total solids being within a range of between about 51% and about 43%. The direct-set milk-plant fat product also has a concentration by weight of milk protein being within a range of between about 5% and about 3%. In examples, the direct-set milk-plant fat product may have a concentration by weight of water being within a range of between about 50% and about 55%; and a corresponding concentration by weight of total solids being within a range of between about 50% and about 45%. In another example, the direct-set milk-plant fat product may have a concentration by weight of milk protein being within a range of between about 4.0% and about 3.5%. In a further example, the direct-set milk-plant fat product may have a concentration by weight of milk fat being less than about 1%. In additional examples, the plant fat in the direct-set milk-plant fat product may be derived from seeds or fruit of: soy, corn, canola, sunflower, safflower, olive, peanut, cottonseed, sesame, almond, apricot, avocado, coconut, flax, grapeseed, hazelnut, palm, palm kernel, pine, poppy, pumpkin, rice bran, tea, walnut, wheat, hemp, acai, cashew, chia, pecan, or hazelnut. In other examples, the direct-set milk-plant fat product may have a concentration by weight of fat, including the plant fat and which may also include milk fat, being within a range of between about 33% and about 16%. As further examples, the direct-set milk-plant fat product may have a pH being: within a range of between about 4.9 and about 4.5; or within a range of between about 4.7 and about 4.6. As an additional example, the direct-set milk-plant fat product may be substantially free of lactic acid-producing bacteria. As another example, the direct-set milk-plant fat product may include, as the edible acid: phosphoric acid, acetic acid, lactic acid, or citric acid. Further, for example, the direct-set milk-plant fat product may be substantially free of lactic acid. In an additional example, the direct-set milk-plant fat product may include a stabilizer. Also, as an example, the direct-set milk-plant fat product may have less than about 1% by weight of phase separation after 15 hours at a temperature within a range of between about 74° F. and about 75° F.

EXAMPLE

A concentrated milk composition is formed by: charging to a 3,000 gallon tank, 5,000 pounds of water, and 7,500 pounds of cream having a concentration by weight of milk fat of about 40%; heating the water/cream to 128° F.; and gradually mixing into the water/cream with agitation, 1,687 pounds of NFDM, 110 pounds of salt, and 65 pounds of a commercial stabilizer (at a resulting stabilizer concentration by weight of about 0.35%). A plant fat composition is formed by charging 3,000 pounds of palm oil to a 3,000 gallon tank and heating to 128° F. A concentrated milk-plant fat composition is formed by mixing together a first amount of 14,362 pounds of the concentrated milk composition and a second amount of 3,000 pounds of the plant fat composition, by gradually adding the plant fat composition to the concentrated milk composition. In forming the concentrated milk-plant fat composition, the first amount of the concentrated milk composition and the second amount of the plant fat composition as prepared with the above ingredients are allocated to and processed as a series of several batches through the 3,000 gallon tanks. The concentrated milk-plant fat composition has a concentration by weight of water of about 50% and a corresponding concentration by weight of total solids of about 50%. The concentrated milk-plant fat composition is pasteurized at 165° F. for 20 minutes and subjected to a 1-stage homogenization at 3,000 PSI. The concentrated milk-plant fat composition is then directly set by addition of 150 pounds of lactic acid, reducing an initial pH of about 6.5 to a pH of about 4.7. The resulting direct-set milk-plant fat product has a concentration by weight of water of about 50%, and a concentration by weight of milk proteins of about 4%.

While the present invention has been disclosed in a presently preferred context, it will be recognized that the present teachings may be adapted to a variety of contexts consistent with this disclosure and the claims that follow. For example, the process shown in the figures and discussed above can be adapted in the spirit of the many optional parameters described, to yield a variety of direct-set milk-plant fat products.

What is claimed is:
1. A process, comprising:
  providing a concentrated milk composition including milk protein, at a first temperature being at least about 20 degrees Fahrenheit (° F.) above a melting point of the concentrated milk composition;
  providing a plant fat composition including plant fat, at a second temperature being at least about 20° F. above a melting point of the plant fat composition;
  combining a first amount of the concentrated milk composition together with a second amount of the plant fat composition, forming a composition that includes concentrated milk, and that includes plant fat, and that has an initial pH, and that has a concentration by weight of water being within a range of between about 49% and about 57%; and combining the composition that includes the concentrated milk and the plant fat together with an amount of an edible acid, and directly setting the composition that includes the concentrated milk and the plant fat, by adjusting the initial pH to a reduced pH being within a range of between about 4.9 and about 4.5;

thereby forming a uniform non-separating direct-set product that substantially retains the milk protein, wherein the product includes a concentrated milk composition, a plant fat composition, and an edible acid.

2. The process of claim 1, wherein the providing the concentrated milk composition includes providing the concentrated milk composition as having a concentration by weight of milk fat being less than about 1%.

3. The process of claim 1, wherein the forming the direct-set product includes forming the direct-set product as being substantially free of lactic acid.

4. The process of claim 1, wherein the forming the composition that includes the concentrated milk and the plant fat includes carrying out the combining of the first amount of the concentrated milk composition together with the second amount of the plant fat composition with a difference between the first and second temperatures being about 5° F. or less.

5. The process of claim 1, wherein the providing the plant fat composition includes providing the plant fat composition at the second temperature as being within a range of between a pasteurization temperature and a temperature being about 20° F. above the melting point of the plant fat composition.

6. The process of claim 1, wherein the providing the plant fat composition includes: providing the plant fat composition as containing palm oil having a melting point being within a range of between about 91° F. and about 102° F.; and providing the second amount of the plant fat composition at the second temperature as being within a range of between about 125° F. and about 130° F.

7. The process of claim 1, wherein the forming the direct-set product includes forming the direct-set product without any culturing of lactic acid-producing bacteria.

8. The process of claim 1, wherein the forming the composition that includes the concentrated milk and the plant fat includes selecting the second amount of the plant fat composition as being less than or equal to about 60% by weight of the composition that includes the concentrated milk and the plant fat.

9. A uniform non-separating direct-set product, comprising:
a concentrated milk composition, a plant fat composition, and an edible acid;
the uniform non-separating direct-set product being made according to a process that includes:
providing a concentrated milk composition including milk protein, at a first temperature being at least about 20 degree Fahrenheit (° F.) above a melting point of the concentrated milk composition;
providing a plant fat composition including plant fat, at a second temperature being at least about 20° F. above a melting point of the plant fat composition;
combining a first amount of the concentrated milk composition together with a second amount of the plant fat composition, forming a composition that includes concentrated milk, and that includes plant fat, and that has an initial pH, and that has a concentration by weight of water being within a range of between about 49% and about 57%; and
combining the composition that includes the concentrated milk and the plant fat together with an amount of an edible acid, and directly setting the composition that includes the concentrated milk and the plant fat, by adjusting the initial pH to a reduced pH being within a range of between about 4.9 and about 4.5;
thereby forming a uniform non-separating direct-set product that substantially retains the milk protein;
wherein the product has a concentration by weight of milk protein being within a range of between about 5% and about 3%; and
wherein the product has a concentration by weight of plant fat being within a range of between about 33% and about 16%.

10. The uniform non-separating direct-set product of claim 9, wherein the forming the composition that includes the concentrated milk and the plant fat includes selecting the second amount of the plant fat composition as being less than or equal to about 60% by weight of the composition that includes the concentrated milk and the plant fat.

11. The uniform non-separating direct-set product of claim 9, wherein the product has a concentration by weight of milk fat being less than 1%.

12. The uniform non-separating direct-set product of claim 9, wherein the plant fat is derived from seeds or fruit of: soy, corn, canola, sunflower, safflower, olive, peanut, cottonseed, sesame, almond, apricot, avocado, coconut, flax, grapeseed, hazelnut, palm, palm kernel, pine, poppy, pumpkin, rice bran, tea, walnut, wheat, hemp, acai, cashew, chia, pecan, or hazelnut.

13. The uniform non-separating direct-set product of claim 9, wherein the product is substantially free of lactic acid-producing bacteria.

14. The uniform non-separating direct-set product of claim 9, wherein the product is substantially free of lactic acid.

15. The uniform non-separating direct-set product of claim 9, wherein the product includes a stabilizer.

16. The uniform non-separating direct-set product of claim 9, wherein the combining the first amount of concentrated milk composition together with the second amount of the plant fat composition includes forming the composition that includes the concentrated milk and the plant fat as having the concentration by weight of water being within a range of between about 50% and about 55%.

17. The uniform non-separating direct-set product of claim 9, wherein the product has a pH being within a range of between about 4.9 and about 4.5.

18. The uniform non-separating direct-set product of claim 9, wherein the product has a pH being within a range of between about 4.7 and about 4.6.

19. The uniform non-separating direct-set product of claim 9, wherein the providing the concentrated milk composition includes providing the concentrated milk composition as including a concentrated milk protein source, wherein the concentrated milk protein source includes: aqueous nonfat milk; condensed nonfat milk; dry nonfat milk ("NFDM"); or reconstituted nonfat milk.

20. The uniform non-separating direct-set product of claim 9, wherein the providing the concentrated milk composition includes combining the concentrated milk composition together with a stabilizer.

21. The uniform non-separating direct-set product of claim 9, wherein the forming the composition that includes the concentrated milk and the plant fat includes carrying out the combining of the first amount of the concentrated milk composition together with the second amount of the plant fat composition with a difference between the first and second temperatures being about 5° F. or less.

22. The uniform non-separating direct-set product of claim 9, wherein the providing the plant fat composition includes providing the plant fat composition at the second temperature as being within a range of between a pasteurization temperature and a temperature being about 20° F. above the melting point of the plant fat composition.

23. The uniform non-separating direct-set product of claim 9, wherein the providing the plant fat composition includes: providing the plant fat composition as containing palm oil having a melting point being within a range of between about 91° F. and about 102° F.; and providing the second amount of the plant fat composition at the second temperature as being within a range of between about 125° F. and about 130° F.

24. The uniform non-separating direct-set product of claim 9, wherein the forming the direct-set product includes forming the direct-set product without any separating, into a curd and a whey, of the composition that includes the concentrated milk and the plant fat.

25. The uniform non-separating direct-set product of claim 9, wherein the forming the direct-set product includes forming the direct-set product without any culturing of lactic acid-producing bacteria.

* * * * *